(12) United States Patent
Weldon

(10) Patent No.: US 10,308,267 B2
(45) Date of Patent: Jun. 4, 2019

(54) WHEELED BAG HOLDER

(71) Applicant: Peter Marvin Weldon, Bartow, FL (US)

(72) Inventor: Peter Marvin Weldon, Bartow, FL (US)

( * ) Notice: Subject to any disclaimer, the term of this patent is extended or adjusted under 35 U.S.C. 154(b) by 4 days.

(21) Appl. No.: 15/644,011

(22) Filed: Jul. 7, 2017

(65) Prior Publication Data

US 2019/0009807 A1  Jan. 10, 2019

(51) Int. Cl.
*B62B 1/14* (2006.01)
*B65B 67/12* (2006.01)
*B65F 1/14* (2006.01)

(52) U.S. Cl.
CPC .............. *B62B 1/14* (2013.01); *B65B 67/12* (2013.01); *B65F 1/1415* (2013.01); *B65F 1/1473* (2013.01); *B62B 2202/22* (2013.01); *B65F 2240/138* (2013.01)

(58) Field of Classification Search
USPC .......................................................... 248/98
See application file for complete search history.

(56) References Cited

U.S. PATENT DOCUMENTS

| | | | | |
|---|---|---|---|---|
| 2,634,933 A * | 4/1953 | Grimsley | ............. | B65F 1/1468 248/129 |
| 3,374,004 A * | 3/1968 | Oliver | ................... | B62B 1/264 248/129 |
| RE27,437 E * | 7/1972 | Bailey | ................... | B62B 1/264 211/85.19 |
| 4,138,139 A * | 2/1979 | Alfonso | ................ | B62B 3/104 248/98 |
| 4,759,518 A * | 7/1988 | Yardas | ................... | B65B 67/12 24/462 |
| 5,351,983 A * | 10/1994 | Descalo | ................... | B62B 1/12 248/96 |
| 5,380,033 A * | 1/1995 | Harling | ................... | B62B 1/12 280/47.19 |
| 5,397,085 A * | 3/1995 | Spagnolo | ............... | B65B 67/12 248/101 |
| 5,456,431 A * | 10/1995 | Ilnisky | ..................... | B62B 3/02 248/150 |
| 5,564,660 A * | 10/1996 | Gyor | ..................... | B65B 67/12 248/97 |
| 5,738,315 A * | 4/1998 | Kent, Jr. | ................. | B65B 67/12 248/156 |

(Continued)

*Primary Examiner* — Monica E Millner
(74) *Attorney, Agent, or Firm* — Cygnet IP Law, P.A.; Stephen W. Aycock, II

(57) ABSTRACT

A wheeled bag holder is described. In some examples, the wheeled bag holder can include a first curved frame member having a first end and a second end and a curved surface that substantially conforms to a circle's curvature, or at least a portion or a segment of the circle's curvature, and a second curved frame member having a first end and a second end and a curved surface that substantially conforms to a circle's curvature, or at least a portion or a segment of the circle's curvature. The wheeled bag holder can also include a first vertical frame member connected to the first curved frame member and the second curved frame member, a second vertical frame member connected to the first curved frame member and the second curved frame member, and a third vertical frame member connected to the first curved frame member and the second curved frame member.

20 Claims, 6 Drawing Sheets

(56) References Cited

U.S. PATENT DOCUMENTS

| | | | | | |
|---|---|---|---|---|---|
| 5,845,915 | A | * | 12/1998 | Wilson | B62B 1/14 |
| | | | | | 280/47.19 |
| 5,860,659 | A | * | 1/1999 | Hart | B60D 1/00 |
| | | | | | 280/400 |
| 6,092,767 | A | * | 7/2000 | Schrager | B65F 1/1468 |
| | | | | | 248/95 |
| 6,352,225 | B1 | * | 3/2002 | Dooley | B62B 3/106 |
| | | | | | 220/908 |
| 6,367,822 | B1 | * | 4/2002 | Hutchins | B62B 1/10 |
| | | | | | 248/99 |
| 6,543,732 | B1 | * | 4/2003 | Yuan | B65B 67/1205 |
| | | | | | 248/101 |
| 8,857,772 | B1 | * | 10/2014 | Weldon | B65B 67/1238 |
| | | | | | 248/95 |
| 8,888,054 | B1 | * | 11/2014 | Peterson | B62B 1/14 |
| | | | | | 248/907 |
| 2005/0103950 | A1 | * | 5/2005 | Joubert | B62B 1/12 |
| | | | | | 248/98 |
| 2007/0120337 | A1 | * | 5/2007 | Gibbs | A01B 1/00 |
| | | | | | 280/79.3 |
| 2012/0325984 | A1 | * | 12/2012 | Moynihan | B65B 31/048 |
| | | | | | 248/98 |

\* cited by examiner

WHEELED BAG HOLDER

FIELD

Some implementations relate generally to an apparatus for holding a bag, and, in particular, to a wheeled bag holder.

BACKGROUND

Flexible plastic bags are commonly used for packaging or holding cut grass, leaves, debris, trash, refuse and other unwanted materials. Cleaning tasks can be facilitated by maintaining the plastic bags with a mouth of the bag (e.g., opening of the bag) in an open or widely open position, by protecting an area of the bags adjacent to the opening from puncturing or tearing, and by facilitating easy removal of a filled bag and installation of an empty bag during and after the collection process.

Some conventional technique for handling bags may not maintain the mouth of the bag in an open position, or may involve the use of trash cans or bins to hold the bags. The trash cans or bins may add additional weight and may be cumbersome for some tasks.

It may be desirable to provide a device for maintaining a plastic bag with the mouth of the bag in an open position and having wheels for ease of moving the bag holder around an area, protecting an area of the bag adjacent to the opening from tearing, and facilitating easy removal of a full bag and installation of an empty bag. Some implementations were conceived in light of the above-mentioned needs, limitations or problems, among other things.

SUMMARY

Some implementations can include a wheeled bag holder. The wheeled bag holder can include a first curved frame member having a first end and a second end and a curved surface that substantially conforms to a circle's curvature, or at least a portion or a segment of the circle's curvature, and a second curved frame member having a first end and a second end and a curved surface that substantially conforms to a circle's curvature, or at least a portion or a segment of the circle's curvature. The wheeled bag holder can also include a first vertical frame member connected to the first curved frame member and the second curved frame member, a second vertical frame member connected to the first curved frame member and the second curved frame member, and a third vertical frame member connected to the first curved frame member and the second curved frame member.

The curved surface of the first curved frame member can include more than 180 degrees of the circle's curvature. The curved surface of the second curved frame member includes more than 180 degrees of the circle's curvature.

The wheeled bag holder can also include a cross support frame member spanning the second curved frame member, and an axle. The wheeled bag holder can further include a first wheel slid onto a first end of the axle, and a second wheel slid onto a second end of the axle.

The wheeled bag holder can also include an elastomeric pad disposed on the second curved frame member. The elastomeric pad can be formed from elastomeric foam.

The wheeled bag holder can also include a first elastomeric end cap disposed on a distal end of the first vertical frame member and a second elastomeric end cap disposed on a distal end of the third vertical frame member.

The wheeled bag holder can further include a first wheel guard attached to the second curved frame member and disposed on the second curved frame member at a location where the first wheel approaches the second curved frame member, and a second wheel guard attached to the second curved frame member and disposed on the second curved frame member at a location where the second wheel approaches the second curved frame member.

The wheeled bag holder can also include a cross support frame member having a first end attached to one side of the second curved frame member and a second end attached to an opposite side of the second curved frame member.

DETAILED DESCRIPTION

Figure 1:
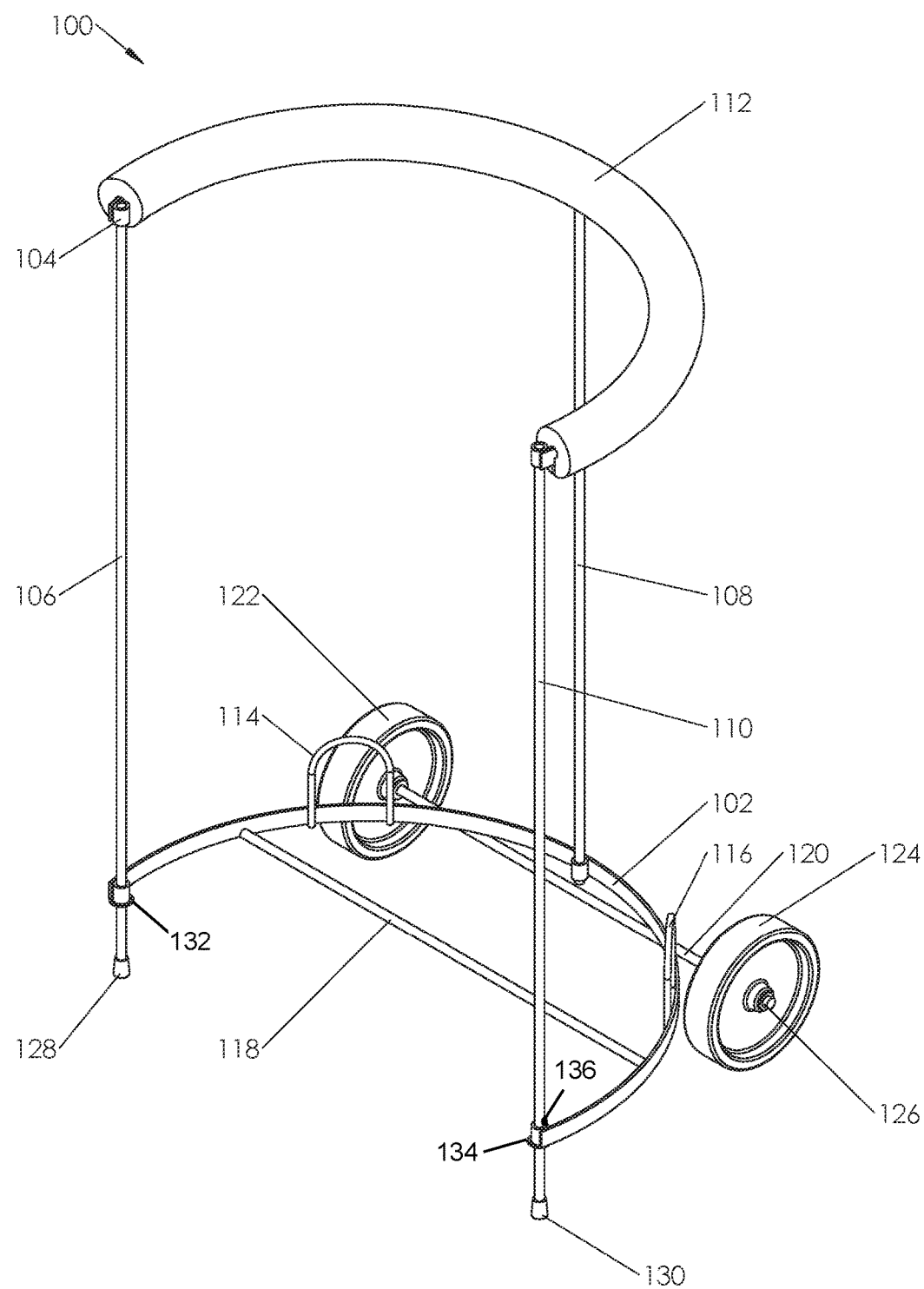
FIG. 1 is a diagram showing a front perspective view of an example wheeled bag holder in accordance with some implementations.
Figure 2:
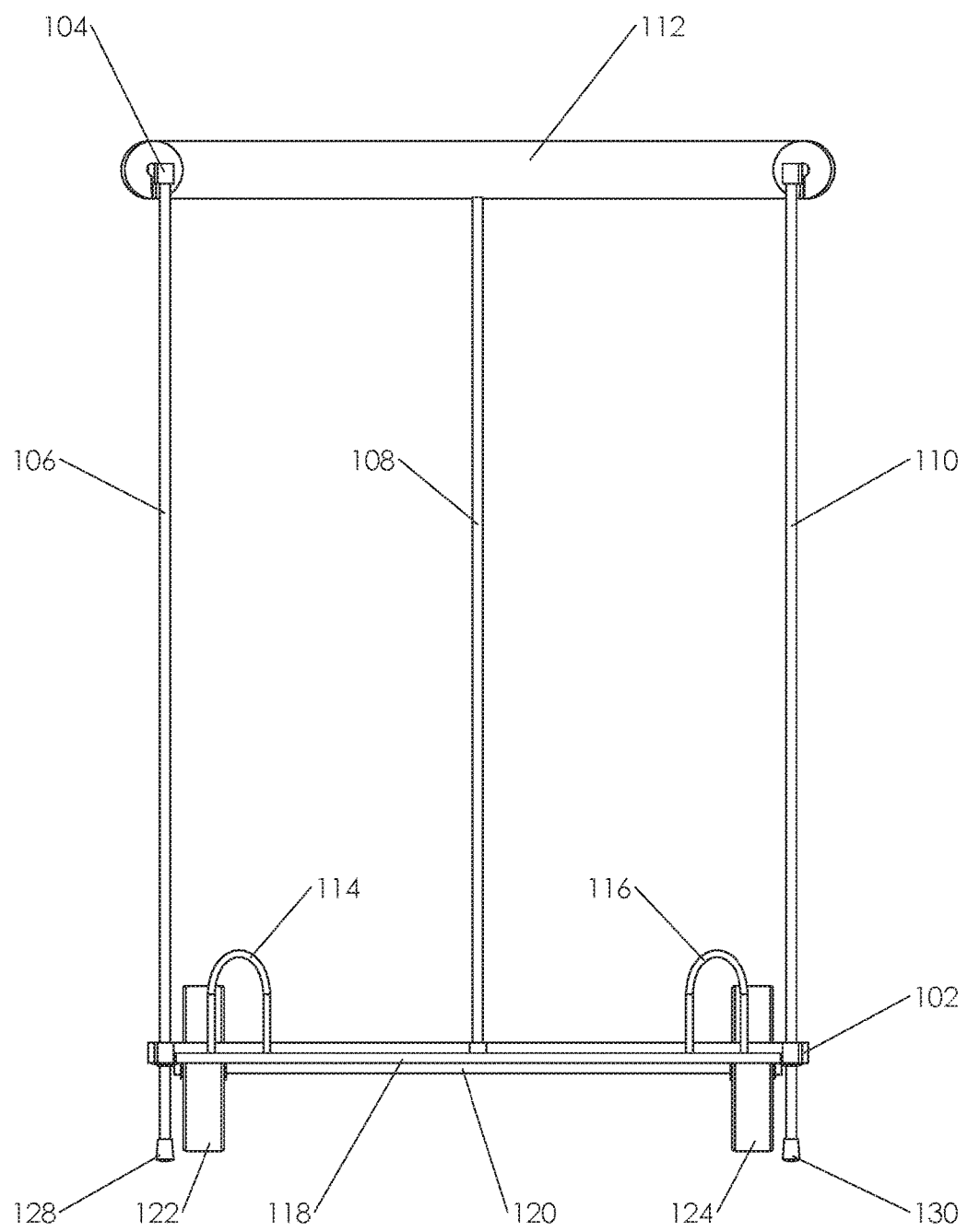
FIG. 2 is a diagram showing a front elevation view of an example wheeled bag holder in accordance with some implementations.
Figure 3:
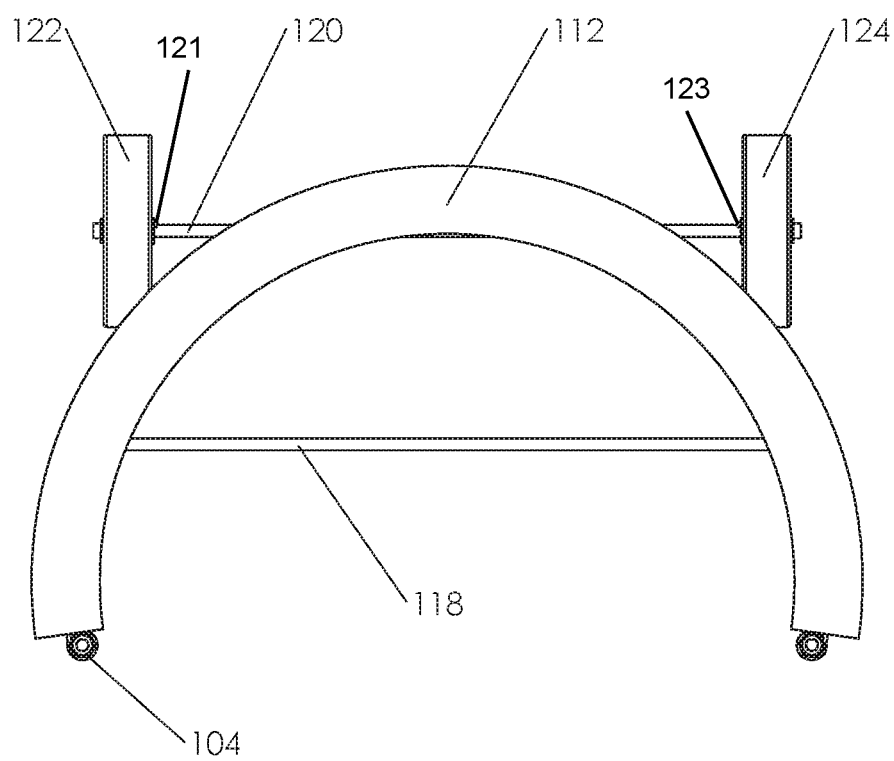
FIG. 3 is a diagram showing a top elevation view of an example wheeled bag holder in accordance with some implementations.
Figure 4:
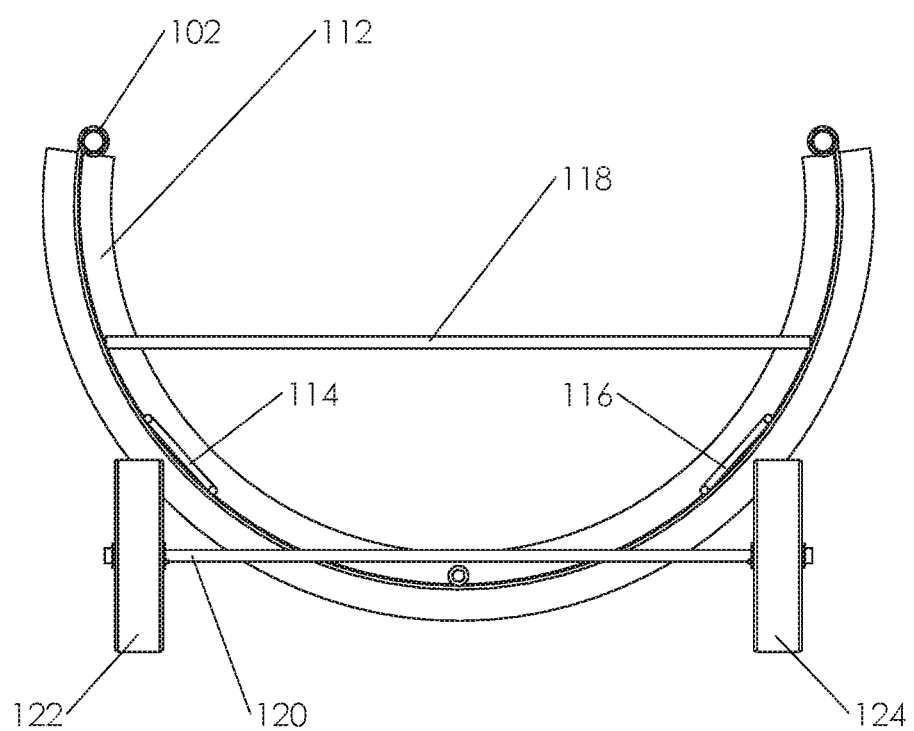
FIG. 4 is a diagram showing a bottom elevation view of an example wheeled bag holder in accordance with some implementations.
Figure 5:
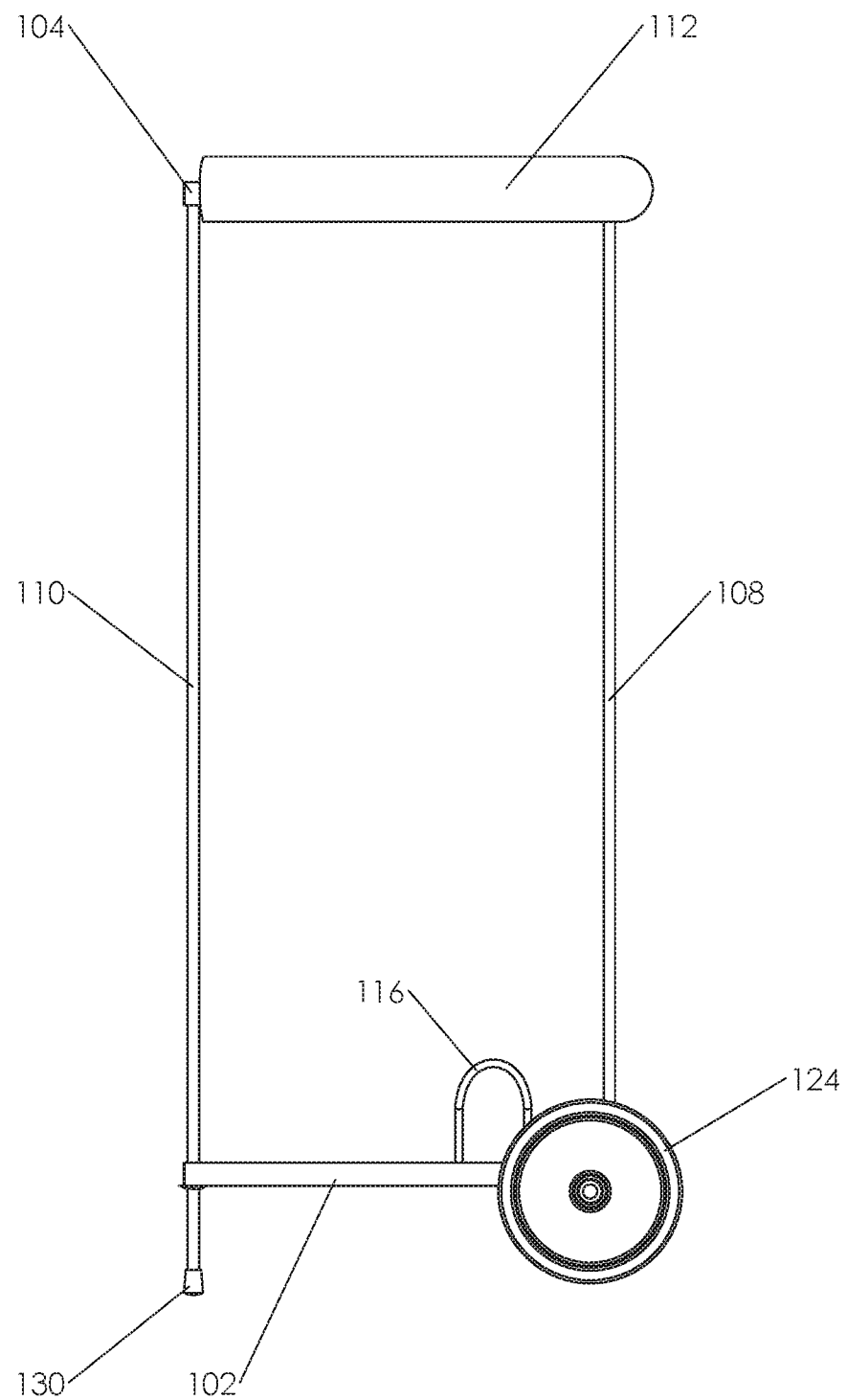
FIG. 5 is a diagram showing a right elevation view of an example wheeled bag holder with elastomeric pad in accordance with some implementations.
Figure 6:
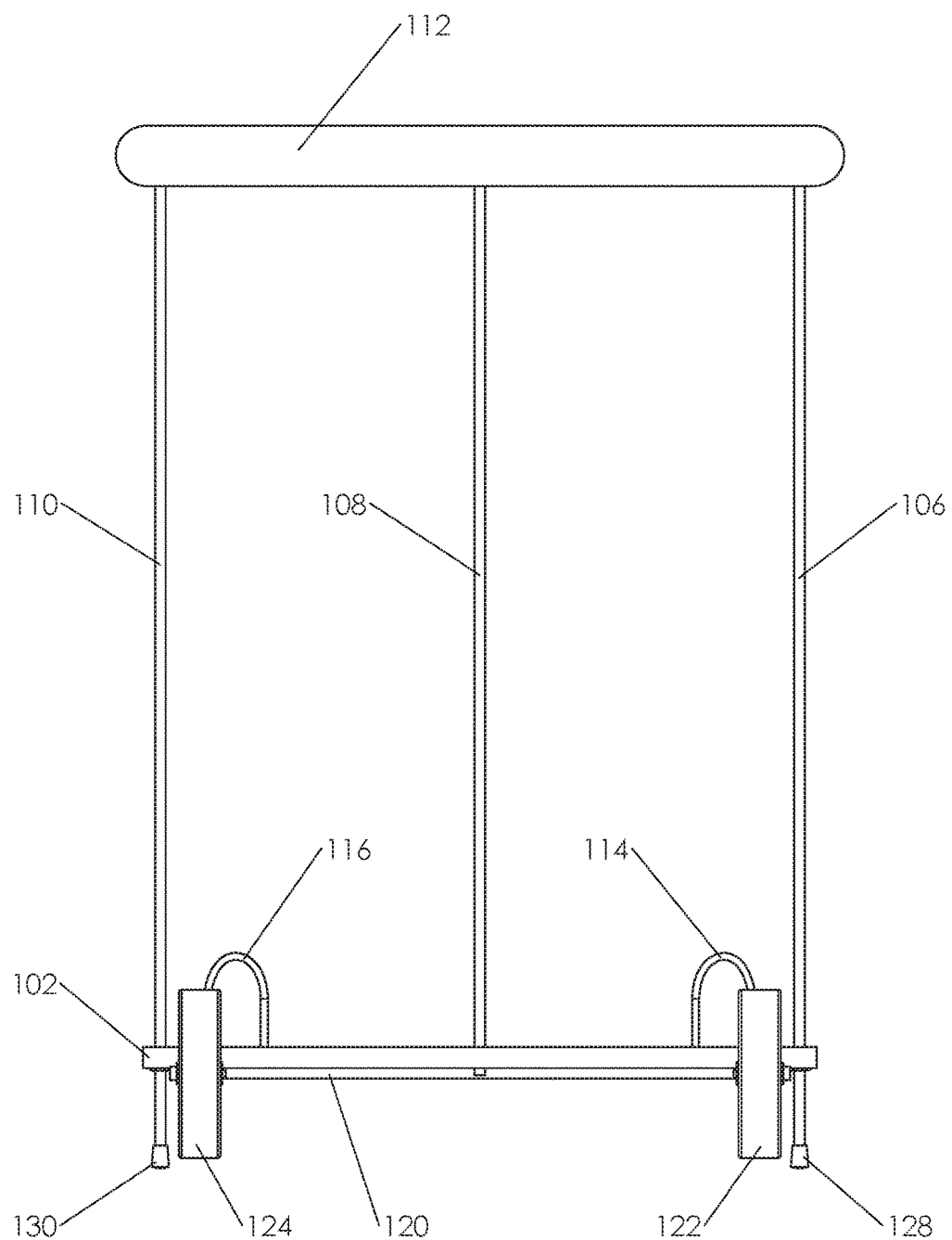
FIG. 6 is a diagram showing a rear elevation view of an example wheeled bag holder with elastomeric pad in accordance with some implementations.

FIGS. 1-6 show diagrams of an example wheeled bag holding device (e.g., 100). As shown in FIG. 1, an example wheeled bag holder 100 includes a bottom curved frame member 102, top curved frame member 104, a first vertical frame member 106, a second vertical frame member 108, a third vertical frame member 110, an elastomeric pad 112, a first wheel guard 114, a second wheel guard 116, a cross support member 118, an axle 120, a first wheel positioning weld bead 121, a first wheel 122, 1 second wheel positioning weld bead 123, a second wheel 124, an axle end cap 126, a first vertical frame member end cap 128, a second vertical frame member end cap 130, a first press fit lock washer 132, a second press fit lock washer 134, and a positioning weld bead 136.

The elastomeric pad 112 is placed over the top curved frame member 104 as described below. The three vertical frame members (106-110) connect the bottom curved frame member 102 to the top curved frame member 104. A press fitted washer (132, 134, respectively) on each of the first vertical frame member 106 and third vertical frame member 110 are disposed below respective ends of the bottom curved frame member and are used to position and secure respective ends of the bottom curved frame member vertically on the vertical frame members and to prevent the ends from moving below the point where the press fitted washer is placed on the respective vertical member. Above the ends of the bottom curved portion 102, on each of the first vertical frame member 106 and third vertical frame member 110, a positioning weld bead (e.g., 136 on vertical member 110) can be used as stops to position the ends of the bottom curved frame member at a desired location (e.g., four inches from the bottom end of the vertical members) and to prevent the ends of the bottom curved portion from sliding higher up than the position weld bead location. It will be appreciated that other types of positioning stops could be used on the vertical frame members such as collars, press fit washers, nut/bolt combinations, screws, etc. The bottom end of the second vertical frame member 108 can be press fit into a retaining member attached to the bottom curved frame member 102. The cross support member 118 is attached to opposite sides of the bottom curved frame member 102 on an inside of the curved member.

An example implementation of a wheel-axle assembly can include a first washer being slid onto an end of the axle 120 followed by the wheel (122 or 124), another washer, and, finally, the axle end cap 126. The first wheel 122 is slid onto one end of the axle 120 and held in place via an axle end cap having a press fit lock washer retained in the end cap (or, alternatively, via a pin/aperture combination, a nut/threaded axle end combination, a clip, etc.) and the second wheel 124 is slid onto the other end of the axle 120 and held in place by an axle end cap (or, alternatively, via a pin/aperture combination, a nut/bolt combination, a clip, etc.). The wheels (122, 124) can be positioned and prevented from sliding further inward on the axle 120 by first and second wheel positioning weld beads (121 and 123, respectively). It will be appreciated that other types of positioning stops could be used on the vertical frame members such as collars, press fit washers, nut/bolt combinations, screws, etc. The wheels (122, 124) can be formed from plastic, rubber, metal or other suitable material. The wheel/axle assembly can also include one or more washers or bearings to help reduce friction and/or make the wheeled bag holder easier to roll. The axle 120 can be welded to the bottom curved frame member 102 or attached using any suitable means.

The wheels (122, 124) permit the wheeled bag holder 100 to be rolled from location to location to help reduce or eliminate a need to lift weight to relocate the bag holder (and bag, which may contain refuse). This permits a user of the wheeled bag holder to potentially collect refuse into a bag being held by the wheeled bag holder that weighs more than the user could otherwise pick up or may desire to pick up. The wheeled bag holder may reduce strain (and potentially injury) to the body of user using the wheeled bag holder to move or collect refuse.

The top and bottom curved frame members (102, 104) can include a metal (e.g., steel) piece that is 3/16" thick, 3/4" wide and about 36 to 42 inches long. The frame members (102, 104) can also provide spring tension to help hold a bag in place. For example, the frame members (102, 104) may have an end to end distance of about 27 inches, which, when taken in conjunction with the length of about 36-42 inches may provide a slightly larger opening than may be able to accommodate the bag without the frame members (102, 104) being placed under some tension. The frame members (102, 104) may be placed under some external pressure (e.g., squeezed together slightly by force of the bag diameter) to effectively make the portion of a circle defined by the frame member smaller so as to accommodate the bag opening size. Then, once the bag is mounted on the top curved frame member 104 and elastomeric pad 112, the tension of the top curved frame member 104 in an outward expansion direction can act to help keep the bag in place on the bag holder.

The elastomeric pad 112 can include an elastomeric pad (e.g., elastomeric foam pad similar to that used to insulate pipes) and can be removable or fixed in place. The elastomeric pad 112 can include a passageway extending the length of the element configured to accommodate insertion of the frame member 104 via a slit along the elastomeric pad 112.

For example, an elastomeric pad used in an exemplary prototype bag holder according to the present disclosure was a length of a widely available elastomeric foam material sold for use in insulating a length of water pipe to impair the loss of heat from a pipe conducting hot water. The pipe insulating material has a passageway extending longitudinally along the entire length of the insulating material and is slit along the entire length of the insulating material to facilitate wrapping the insulating material around a water pipe. The edges of the slit are commonly provided with adhesive strips to fasten the edges of the slit together to retain the insulating material in place around the water pipe. The elastomeric foam material used with the exemplary prototype of the second embodiment of the present invention had a passageway with a diameter of about 1/2 to about 5/8 inch with the wall of elastomeric foam having a thickness of about 1/2 inch, and a length of about 36 inches to 42 inches which is of similar length as the length of the top curved frame member 104. There are prior art bag holder devices that require one or more clips to be used to retain a plastic bag folded over a support member of the device, which requires effort by a person to install and remove the clips, and hopefully not misplace or damage the clips. The elastomeric pad of the present disclosure (e.g., 112) preferably has a surface that is not smooth for engaging a plastic bag folded around the elastomeric pad and frame member, but rather is uneven and rough enough to cause friction between the pad and the plastic bag to aid in maintaining the plastic bag in a desired operative position with regards to the bag holder to retain the plastic bag in substantially static contact with the bag holder with the bag open. An elastomeric foam pad without a smooth outer engagement surface meets these requirements at a reasonable cost. It is understood that if desired the elastomeric pad does not have to extend continuously along the entire length of the frame member and does not have to be folded around the frame member so long as the elastomeric pad, or pads, engage a plastic bag that is folded over the frame member.

The frame members (e.g., 102-110 and 114-120) can be formed from steel, aluminum, injection molded plastic or other suitable material. The curved frame members (102, 104) can include a metal (e.g., aluminum) piece that is about 1/8" thick, about 3/4" wide and about 36 to 42 inches long. The top curved frame member 104 can also provide spring tension to help hold a bag in place. For example, the top curved frame member 104 may have an end to end distance of about 27 inches, which, when taken in conjunction with the length of about 36-42 inches may provide a slightly larger opening than may be able to accommodate the bag without the top curved frame member 104 being placed under some tension. The top curved frame member 104 may be placed under some external pressure (e.g., squeezed together slightly by force of the bag diameter) to effectively make the portion of a circle defined by the frame member smaller so as to accommodate the bag opening size. Then, once the bag is mounted on the frame member and protective element, the tension of the top curved frame member 104 in an outward expansion direction can act to help keep the bag in place on the bag holder.

It will be appreciated that any dimensions described herein are for illustration purposes only and are not intended to be limiting. Other dimensions could be used depending on a contemplated implementation.

It is, therefore, apparent that there is provided, in accordance with the various example implementations disclosed herein, a wheeled bag holder.

While the disclosed subject matter has been described in conjunction with a number of implementations, it is evident that many alternatives, modifications and variations would be or are apparent to those of ordinary skill in the applicable arts. Accordingly, Applicant intends to embrace all such alternatives, modifications, equivalents and variations that are within the spirit and scope of the disclosed subject matter.

What is claimed is:

1. A wheeled bag holder comprising:
a first curved frame member having a first end and a second end and a curved surface that substantially conforms to a curvature of a circle, or at least a portion or a segment of the curvature of the circle;
a second curved frame member having a first end and a second end and a curved surface that substantially conforms to the curvature of the circle, or at least a portion or a segment of the curvature of the circle;
a first vertical frame member connected to the first curved frame member and the second curved frame member;
a second vertical frame member connected to the first curved frame member and the second curved frame member;
a third vertical frame member connected to the first curved frame member and the second curved frame member;
a cross support frame member spanning the second curved frame member;
an axle attached to the second curved frame member;
a first vertical frame member end cap;
a second vertical frame member end cap;
a first press fit lock washer;
a second press fit lock washer;
a positioning weld bead;
a first wheel on a first end of the axle;
a second wheel on a second end of the axle;
an axle end cap;
a first wheel positioning weld bead; and
a second wheel positioning weld bead,
wherein the first wheel positioning weld bead and the second wheel positioning weld bead prevent the first wheel and the second wheel respectively from sliding inward from the first end of the axle and the second end of the axle respectively,
wherein the first press fit lock washer and the second press fit lock washer are disposed below respective ends of the second curved frame member and are used to position and secure the respective ends of the second curved frame member vertically on the first vertical frame member and the third vertical frame member respectively to prevent the respective ends from moving below points where the first press fit lock washer and the second press fit lock washer are placed on the first vertical frame member and the third vertical frame member respectively, and
wherein the positioning weld bead is used as a stop to position the ends of the second curved frame member at a predetermined location and to prevent the ends of the second curved portion from sliding upwards relative to the predetermined location of the positioning weld bead.

2. The wheeled bag holder of claim 1, further comprising an elastomeric pad disposed on the first curved frame member.

3. The wheeled bag holder of claim 2, wherein the elastomeric pad is formed from elastomeric foam.

4. The wheeled bag holder of claim 1, further comprising a first elastomeric end cap disposed on the first end of the first curved frame member and a second elastomeric end cap disposed on the second end of the second curved frame member.

5. The wheeled bag holder of claim 1, wherein the curved surface of the first curved frame member includes more than 180 degrees of the circle's curvature.

6. The wheeled bag holder of claim 1, wherein the curved surface of the second curved frame member includes more than 180 degrees of the circle's curvature.

7. The wheeled bag holder of claim 1, further comprising:
a first wheel guard attached to the second curved frame member and disposed on the second curved frame member at a location where the first wheel approaches the second curved frame member; and
a second wheel guard attached to the second curved frame member and disposed on the second curved frame member at a location where the second wheel approaches the second curved frame member.

8. The wheeled bag holder of claim 1, wherein the cross support frame member has a first frame member end attached to one side of the second curved frame member and a second frame member end attached to an opposite side of the second curved frame member.

9. A wheeled bag holder comprising:
a first curved frame member having a first curved surface that substantially conforms to one of a curvature of a circle or one of a portion or a segment of the curvature of the circle;
a second curved frame member having a second curved surface that substantially conforms to the curvature of the circle or one of the portion or the segment of the curvature of the circle;
a first vertical frame member connected to the first curved frame member and the second curved frame member;
a second vertical frame member connected to the first curved frame member and the second curved frame member;
a third vertical frame member connected to the first curved frame member and the second curved frame member;
a cross-support frame member spanning the second curved frame member;
an axle attached to the second curved frame member;
a first vertical frame member end cap;
a second vertical frame member end cap;
a first press fit lock washer;
a second press fit lock washer;
a positioning weld bead;
a first wheel on a first axle end of the axle;
a second wheel on a second axle end of the axle;
an axle end cap;
a first wheel positioning weld bead;
a second wheel positioning weld bead;
a first wheel guard attached to the second curved frame member and disposed on the second curved frame member at a location where the first wheel approaches the second curved frame member; and
a second wheel guard attached to the second curved frame member and disposed on the second curved frame member at a location where the second wheel approaches the second curved frame member,
wherein the first wheel positioning weld bead and the second wheel positioning weld bead prevent the first wheel and the second wheel respectively from sliding inward from the first axle end and the second axle end respectively, and wherein the positioning weld bead is used as a stop to position the ends of the second curved frame member at a predetermined location and to prevent the ends of the second curved portion from sliding upwards relative to the predetermined location of the positioning weld bead.

10. The wheeled bag holder of claim 9, further comprising an elastomeric pad disposed on the first curved frame member.

11. The wheeled bag holder of claim 10, wherein the elastomeric pad is formed from elastomeric foam.

12. The wheeled bag holder of claim 9, further comprising a first elastomeric end cap disposed on a first end of the first curved frame member and a second elastomeric end cap disposed on a second end of the second curved frame member.

13. The wheeled bag holder of claim 9, wherein the first curved surface of the first curved frame member includes more than 180 degrees of the circle's curvature.

14. The wheeled bag holder of claim 9, wherein the second curved surface of the second curved frame member includes more than 180 degrees of the circle's curvature.

15. The wheeled bag holder of claim 10, wherein the first curved frame member provides spring tension to hold a bag in place.

16. The wheeled bag holder of claim 9, wherein the cross-support frame member has a first frame member end attached to one side of the second curved frame member and a second frame member end attached to an opposite side of the second curved frame member.

17. A wheeled bag holder comprising:
a first curved frame member having a first curved surface;
a second curved frame member having a second curved surface;
a first vertical frame member connected to the first curved frame member and the second curved frame member;
a second vertical frame member connected to the first curved frame member and the second curved frame member;
a third vertical frame member connected to the first curved frame member and the second curved frame member;
a cross-support frame member spanning the second curved frame member;
an axle attached to the second curved frame member;
a first vertical frame member end cap;
a second vertical frame member end cap;
a first press fit lock washer;
a second press fit lock washer;
a positioning weld bead;
a first wheel on a first axle end of the axle;
a second wheel on a second axle end of the axle;
an axle end cap;
a first wheel positioning weld bead;
a second wheel positioning weld bead; and
an elastomeric pad disposed on the first curved frame member, wherein the first curved frame member provides spring tension to hold a bag in place.

18. The wheeled bag holder of claim 17, wherein the cross-support frame member has a first frame member end attached to one side of the second curved frame member and a second frame member end attached to an opposite side of the second curved frame member.

19. The wheeled bag holder of claim 17, wherein the first press fit lock washer and the second press fit lock washer are disposed below respective ends of the second curved frame member and are used to position and secure the respective ends of the second curved frame member vertically on the first vertical frame member and the third vertical frame member respectively to prevent the respective ends from moving below points where the first press fit lock washer and the second press fit lock washer are placed on the first vertical frame member and the third vertical frame member respectively.

20. The wheeled bag holder of claim 17, wherein the elastomeric pad is formed from elastomeric foam.

* * * * *